Sept. 25, 1923.                      1,469,190
D. D. ORMSBY
DIFFERENTIAL GEARING
Filed June 14, 1918
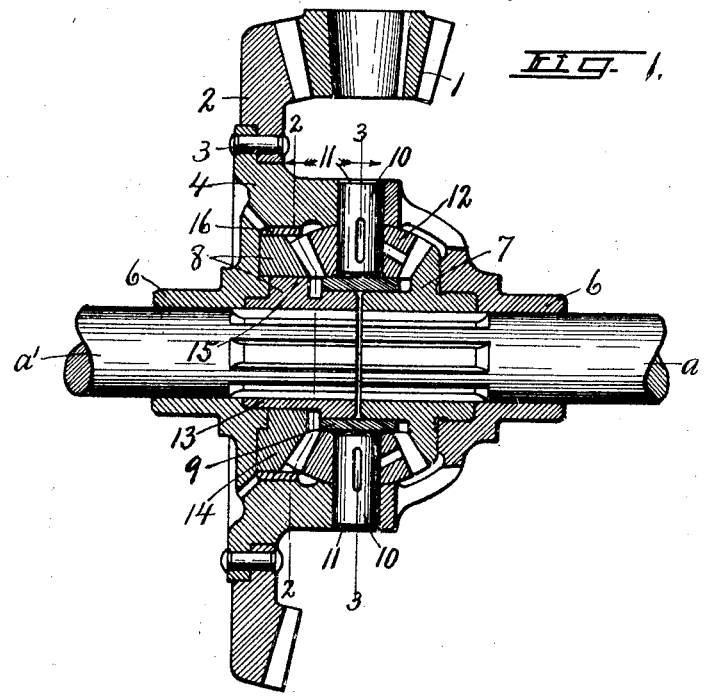
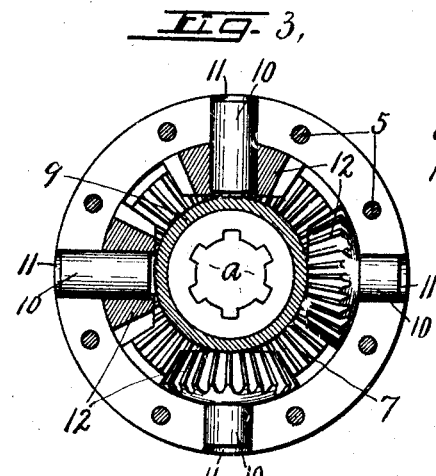
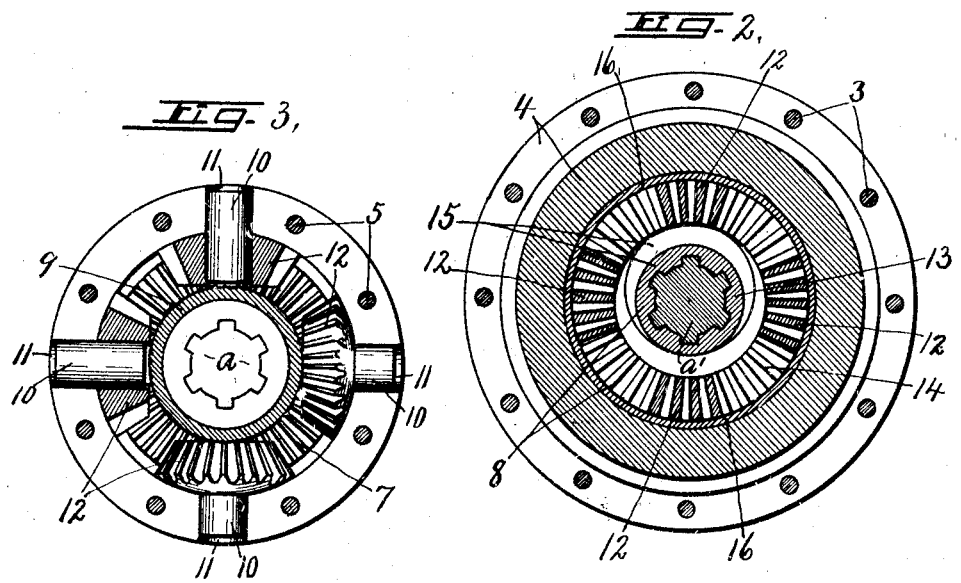
INVENTOR
D. D. Ormsby
BY Howard P. Denison
ATTORNEY.

Patented Sept. 25, 1923.

1,469,190

UNITED STATES PATENT OFFICE.

DONALD D. ORMSBY, OF SYRACUSE, NEW YORK, ASSIGNOR TO BROWN LIPE CHAPIN COMPANY, OF SYRACUSE, NEW YORK, A CORPORATION OF NEW YORK.

DIFFERENTIAL GEARING.

Application filed June 14, 1918. Serial No. 239,989.

*To all whom it may concern:*

Be it known that I, DONALD D. ORMSBY, a citizen of the United States of America, and a resident of Syracuse, in the county of Onondaga, in the State of New York, have invented new and useful Improvements in Differential Gearing, of which the following, taken in connection with the accompanying drawings, is a full, clear, and exact description.

This invention relates to certain improvements in differential gearing as used more particularly in the transmission of power from the motor to the traction-wheels of motor-driven road-vehicles to automatically establish the desired speed ratio of both wheels when traveling along direct or angular courses, but may be used in other relations where two rotary members are required to be driven simultaneously at the same speed or at different speeds from the same driving member under varying degrees of resistance.

It is well known that in the use of ordinary differential gearing as commonly employed on automobiles and similar road vehicles having divided axles for the traction wheels, it frequently happens that the tractional resistance of said wheels becomes unbalanced or unequal to the extent of allowing the entire motive power to be spent in driving or "spinning" the wheel having the least tractional resistance while the other wheel remains substantially stationary, resulting in the "stalling" of the machine.

The primary object of this present invention is to overcome these objectionable results by providing simple, compact, and efficient means whereby a substantial disturbance of the balance of resistance to rotation of the driven members will automatically cause the driving member to rotate both of said members at the same speed until the balance of resistance is substantially restored and maintained without in any way affecting the automatic differential action of said members or traction wheels when the machine is deflected from a straight course.

One of the specific objects is to permit the use of a device of this character in the standard forms and sizes of differential gears with a minimum degree of alteration and without adding materially to the cost of manufacturing or installation so that differential gears embodying my invention may be readily substituted for those now in common use.

Other objects and use will be brought out in the following description:—

In the drawings—

Figure —1— is a horizontal sectional view of a differential gearing embodying my invention adapted to be used on automobiles and similar road vehicles.

Figures —2— and —3— are transverse sectional views taken respectively in the planes of line 2—2 and 3—3 Figure —1—, except that the larger gear ring is omitted from Figure —2—.

As illustrated, this differential gear is adapted to be used for transmitting motion from the motor shaft to the relatively rotatable wheel-supporting axles —a— and —a'— of a road vehicle, the driving means consisting of a pinion —1— on the motor shaft meshing with the gear ring —2— which is secured by bolts or rivets —3— to a rotary frame or yoke —4— containing the differential gearing hereinafter described.

This rotary frame or yoke —4— extends axially substantially equal distances from and to opposite sides of the meeting ends of the shaft sections —a— and —a'— and is preferably divided transversely in a plane substantially coincident with said meeting ends to facilitate assembling of the inclosed parts of the differential gearing, the opposite sections formed by said transverse division being secured together by bolts —5— when the various parts are assembled for use.

The opposite or outer ends of the frame or yoke —4— are provided with journal bearings —6— for receiving the adjacent portions of the shaft sections —a— and —a'— and permitting relative rotation of the frame and shaft sections. Opposed bevel gears —7— and —8— are mounted upon the adjacent ends of the shaft sections —a— and —a'— to rotate therewith, the adjacent ends of the hubs of said gears having external annular bearings upon which is journaled a sleeve —9— having a series of, in this instance, four radially projecting studs —10— arranged in pairs, those of each pair being diametrically opposite each other, their outer ends being seated in suitable openings —11— in the frame or yoke —4—, said studs being disposed in substantially the same plane as the meeting ends of the axial sections as shown more clearly in Figure —1—.

Upon these studs —10— are journaled a corresponding number of bevel pinions —12— meshing with the gears —7— and —8— for transmitting rotary motion from the frame or yoke —4— to said gears and through the latter to the axial sections —a— and —a'—.

The gear —8— is made in two parts consisting of an eccentric or cam-collar —13— and an outer gear-ring —14—, the collar —13— being provided with an eccentric circular bearing or periphery —15— while the gear-ring —14— is provided with a similar internal eccentric bearing fitting closely upon the eccentric bearing of the collar —13— to form a wedging connection between these parts.

A circular friction ring or bushing —16— of bronze or other suitable material is tightly fitted within and secured to the frame or yoke —4— around the periphery of the gear-ring —14— in close proximity thereto to cooperate therewith in a manner hereinafter described for automatically preventing the relative slipping or spinning of either wheel in case the traction of the wheels or resistance to rotation of the driven members as —a— and —a'— should be unbalanced or unequal.

For example—assuming that the motor is in operation and in driving connection with the frame or yoke —4— and that the tractional resistance of one of the wheels is less than that of the other wheel to such an extent as to allow the one having the least tractional resistance to slip while the other wheel remains substantially stationary, then the power applied to the gear ring —14— tending to rotate it in the same direction as the other driven member —7— combined with the ground resistance tending to oppose the rotation of the eccentric member —13— will cause the member —14— to be slightly moved eccentrically and therefore radially upon the eccentric member —13— and against the inner face of the bushing —16— with a resultant force sufficient to frictionally lock the parts —14— and —16— to each other thereby establishing a positive drive between the frame —4— and the shaft section of the slipping traction wheel substantially equal to that between the frame and the other shaft section and causing both driven members as —a— and —a'— to be rotated at substantially the same speed required for direct driving.

On the other hand, if the tractional resistance is substantially balanced or equal, the same frictional lock will be established between the frame —4— and eccentrically related parts —13— and —14— to rotate the driven member as —a— and —a'— at practically the same speed when the machine is moving in a direct course and will also permit the desired differential action of said driven members when the machine is deflected from a direct line of travel.

It therefore follows that any substantial disturbance of the balance of resistance transmitted to the two driven parts, as —a— and —a'—, will automatically cause the driving member, as —1—, —2— or —4— to rotate both driven members at substantially the same speed and continue to so rotate them until a substantial balance of resistance occurs.

What I claim is:

1. A differential gearing having one of its driven gears made in two parts eccentrically mounted one upon the other whereby the relative rotation of said parts will frictionally lock one of them to the driving gear and to the other part for positively rotating both of the driven gears.

2. A differential gearing having its rotary driving member provided with an annular bearing, and one of its driven gears made in two parts eccentrically mounted one upon the other within said bearing whereby the relative rotation of said parts will frictionally lock one of them to said bearing and to the other part and cause both driven gears to rotate at substantially the same speed.

3. The combination of a rotary driving gear, separate driven gears co-axial with the driving gear, and pinions carried by the driving member and meshing with the driven gears, one of said driven gears being made in two parts eccentrically mounted one upon the other whereby the relative rotation of said parts will cause one of them to frictionally engage the driving member and thereby rotate both of the driven gears at substantially the same speed.

4. A differential gearing comprising a rotary driving member having a concentric bearing, a rotary two-part driven gear having one part eccentrically mounted upon the other part for frictional contact with said bearing when the two parts of said driven gear are relatively rotated an additional driven gear, a planet gear mounted on the driving member and connecting said additional driven gear with one of the parts of the other driven gear.

5. In a differential gearing the combination of a driving member having a friction face, a pinion mounted on the driving member, a gear meshing with one side of the pinion, a rotary member co-axial with said gear and provided with an eccentric bearing, and a gear ring movably mounted on the eccentric bearing and meshing with the opposite side of the pinion whereby a relative rotary movement of the gear-ring and said rotary member will cause said gear-ring to frictionally engage the friction face of the driving member to prevent excessive relative rotation of said gear and rotary member.

6. A differential gearing having a driving element and relatively rotatable coaxial driven elements, one of said driven elements being composed of relatively movable parts having inter-engaging cam faces, and a rotary planetary member mounted on the driving element and transmitting motion to one of said parts to cause that part to frictionally interlock with the driving element by the relative movement of the cam face of one part against the cam face of the other part.

7. In a differential gearing, a rotary driving element, rotary coaxial driven elements, one of which is composed of relatively movable parts having eccentric engaging faces, and means carried by the driving element for transmitting motion to one of said parts to cause the rotation of that part relatively to the other part and thereby to frictionally engage the first named part with the driving element.

8. A differential gearing comprising a rotary frame having a circular bearing, relatively rotatable coaxial axle sections, and a system of differential bevel gears for transmitting motion from the frame to said axle sections, one of the differential gears being composed of relatively movable parts, one of the parts engaging the circular bearing of the frame, the other part having an eccentric bearing face engaging the first named part to force the latter into frictional engagement with the circular bearing.

9. A differential gearing comprising a rotary driving element having an internal annular bearing, coaxial rotary driven elements, a gear mounted on one of the driven elements, an eccentric mounted on the other driven element, a gear-ring mounted on the eccentric and engaged with said annular bearing of the driving member, and pinions mounted on the driving element and meshing with said gear and gear-ring, said gear-ring and eccentric being relatively adjustable rotarily to lighten and loosen the gear-ring against and from said annular bearing.

10. A differential gearing comprising a rotary driving element having a friction clutch face, coaxial sections rotatable relatively to each other and to the driving element, cooperative cam sections, one of which is secured to one of the axle sections, the other cam member being adapted to engage the frictional clutch face of the driving element, said cam members being relatively adjustable rotarily to cause a frictional lock between said cam members and also between one of the cam members and said frictional clutch face of the driving member, and means for transmitting rotary motion from the driving element to the other axle section and to the cam member which engages the friction clutch face of said driving member.

In witness whereof I have hereunto set my hand this 4th day of June, 1918.

DONALD D. ORMSBY.

Witnesses:
H. E. CHASE,
H. N. FURST.